US012632585B1

(12) United States Patent
Koe et al.

(10) Patent No.: US 12,632,585 B1
(45) Date of Patent: May 19, 2026

(54) MULTILAYER QUERY FILTERING LOGIC TRANSFORMATIONS

(71) Applicant: Rapid7, Inc., Boston, MA (US)

(72) Inventors: Jessica Koe, Los Angeles, CA (US); Alex Gurvets, Los Angeles, CA (US); Michael Huffman, San Luis Obispo, CA (US); Rahul Monga, Austin, TX (US); Afrin Subair, San Diego, CA (US); Courtney Wood, Los Angeles, CA (US)

(73) Assignee: Rapid7, Inc., Boston, MA (US)

( * ) Notice: Subject to any disclaimer, the term of this patent is extended or adjusted under 35 U.S.C. 154(b) by 440 days.

(21) Appl. No.: 17/939,295

(22) Filed: Sep. 7, 2022

(51) Int. Cl.
 *G06F 21/62* (2013.01)
 *G06F 16/2453* (2019.01)
 *G06F 21/57* (2013.01)

(52) U.S. Cl.
 CPC .... *G06F 21/6227* (2013.01); *G06F 16/24534* (2019.01); *G06F 21/577* (2013.01)

(58) Field of Classification Search
 CPC .......... G06F 21/6227; G06F 16/24534; G06F 21/577
 See application file for complete search history.

(56) References Cited

U.S. PATENT DOCUMENTS

| | | | |
|---|---|---|---|
| 9,229,998 B2 | 1/2016 | Iyer et al. | |
| 11,074,257 B2 | 7/2021 | Lee et al. | |
| 11,194,905 B2 | 12/2021 | Sanchez et al. | |
| 2016/0063080 A1 | 3/2016 | Nano et al. | |
| 2017/0098012 A1* | 4/2017 | Zhu ................... | G06F 16/24578 |
| 2018/0137177 A1* | 5/2018 | Belcher .............. | G06F 16/2433 |
| 2018/0159876 A1 | 6/2018 | Park et al. | |
| 2020/0296137 A1 | 9/2020 | Crabtree et al. | |

* cited by examiner

*Primary Examiner* — Aleksandr Kerzhner
*Assistant Examiner* — Aryan D Toughiry
(74) *Attorney, Agent, or Firm* — Ashwin Anand

(57) ABSTRACT

Various embodiments include systems and methods to implement a security platform providing query transformations and layered filtering. Security data associated with a client deployment of assets may be determined and analyzed for identifying security vulnerabilities. The security platform may support an application programming interface that provides a flexible query format that allows multiple layers of filtering logic at various layers of a frontend query. The filtering logic may be translated into a backend query format used to retrieve security data specified by the frontend query.

20 Claims, 9 Drawing Sheets

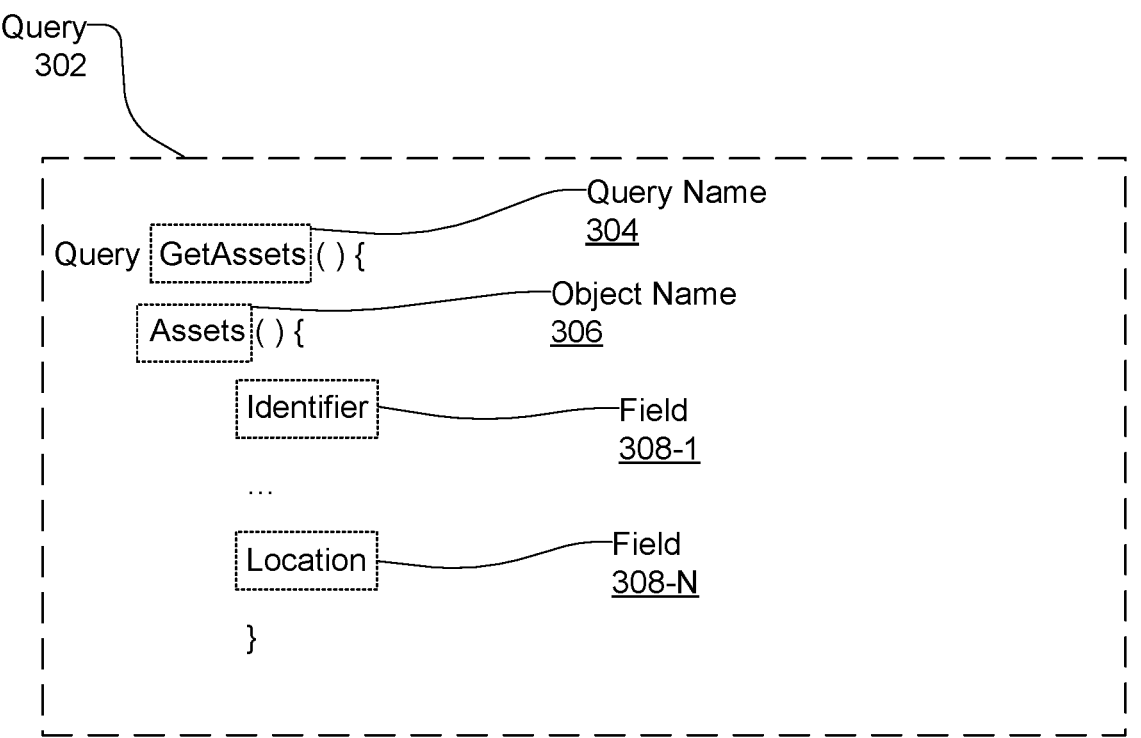
Query
302
Query Name
304
Query GetAssets ( ) {
Object Name
306
Assets ( ) {
Identifier
Field
308-1
...
Location
Field
308-N
}
FIG. 3

Query
602

Layer
606-1

Layer
606-2

Query QueryName {

ObjectName-1 ( FilterParameter-1 ) {

FieldName-1

Filtering Logic
604-1

...

FieldName-M

ObjectName-2 ( FilterParameter-2 ) {

FieldName-N

Filtering Logic
604-2

...

}

}

700

Determine, based on a frontend query specified in accordance with a first format, a first layer of one or more attributes associated with a set of structured data.
710

Determine, with respect to the frontend query, at least one additional layer of one or more attributes associated with the set of structured data.
720

Determine, based on the first layer and on the at least one additional layer, a backend query specified in accordance with a second format.
730

Determine, based on querying the database using the backend query, a dataset.
740

Determine, based on the frontend query, a response indicative of the dataset.
750

*FIG. 7*

800

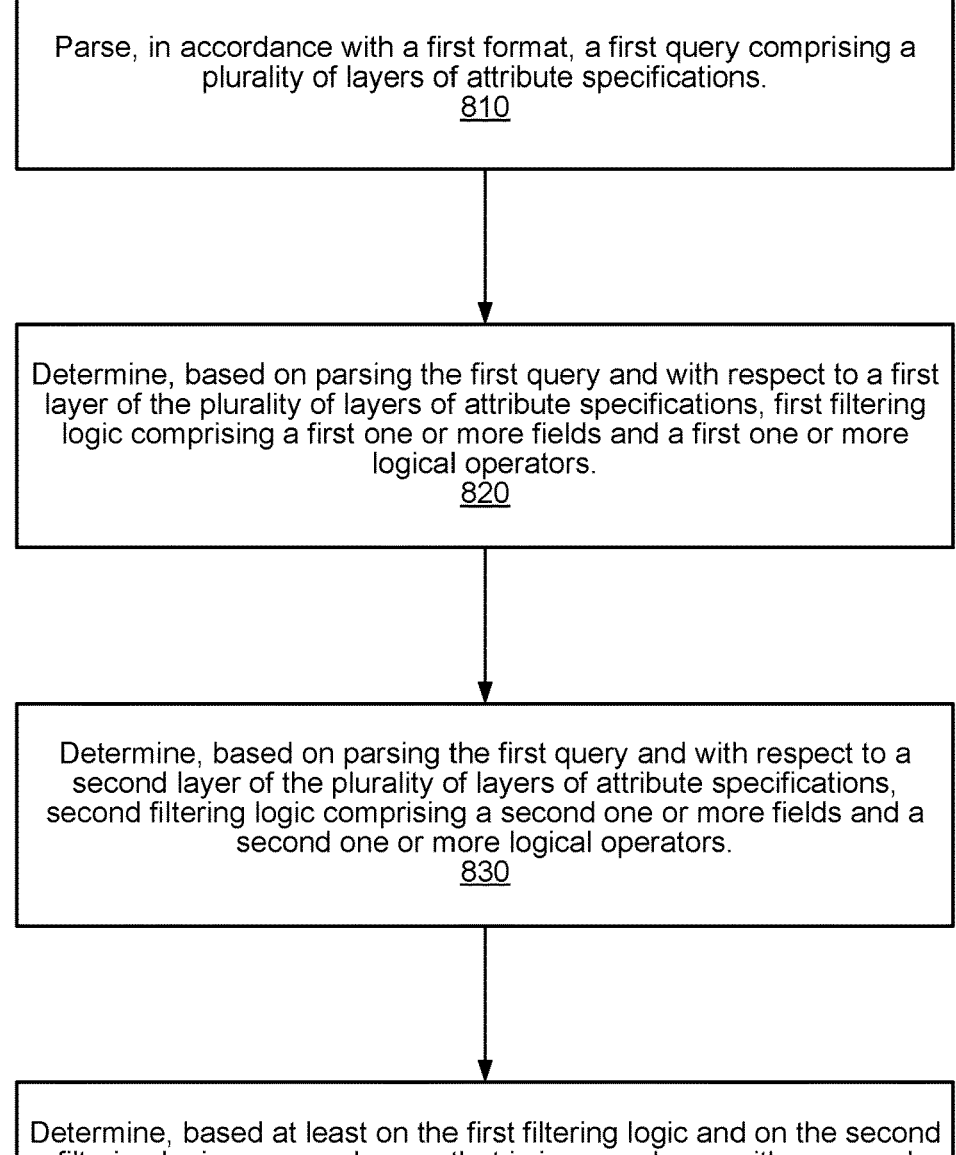

Parse, in accordance with a first format, a first query comprising a plurality of layers of attribute specifications.
810

Determine, based on parsing the first query and with respect to a first layer of the plurality of layers of attribute specifications, first filtering logic comprising a first one or more fields and a first one or more logical operators.
820

Determine, based on parsing the first query and with respect to a second layer of the plurality of layers of attribute specifications, second filtering logic comprising a second one or more fields and a second one or more logical operators.
830

Determine, based at least on the first filtering logic and on the second filtering logic, a second query that is in accordance with a second format.
840

*FIG. 8*

MULTILAYER QUERY FILTERING LOGIC TRANSFORMATIONS

BACKGROUND

Many companies operate computer environments that are connected to public networks such as the internet. While such connections allow users to access resources on public networks, they also expose a company network to cyberattacks. Cyberattacks may obtain sensitive information, gain control of the company's computing systems, or damage company resources. To prevent cyberattacks, security management systems have become increasingly important to protect private company networks against these types of vulnerabilities.

BRIEF DESCRIPTION OF THE DRAWINGS

FIG. 3 is a block diagram illustrating a query format used by a security platform providing query transformations and layered filtering, in accordance with some embodiments.

FIG. 7 is a flowchart that illustrates an example of a security platform providing query transformations and layered filtering, according to some embodiments.

FIG. 8 is a flowchart that illustrates an example of a security platform providing query transformations and layered filtering, according to some embodiments.

Figure 1:
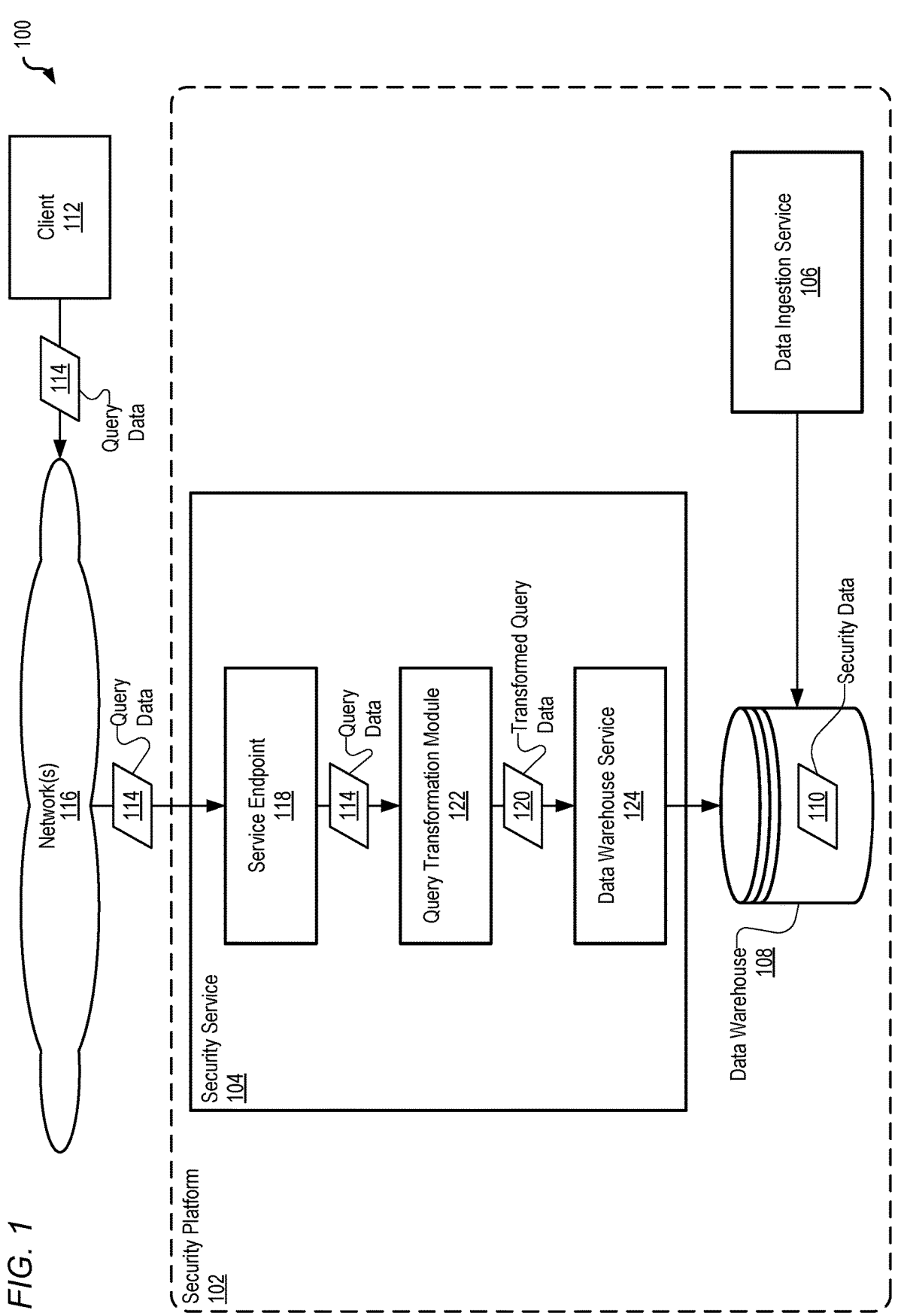
FIG. 1 is a block diagram illustrating a security platform providing query transformations and layered filtering, in accordance with some embodiments.

While embodiments are described herein by way of example for several embodiments and illustrative drawings, those skilled in the art will recognize that embodiments are not limited to the embodiments or drawings described. It should be understood that the drawings and detailed description are not intended to limit embodiments to the particular form disclosed, but on the contrary, the intention is to cover all modifications, equivalents and alternatives falling within the spirit and scope as defined by the appended claims. As used throughout this disclosure, the word "may" is used in a permissive sense (i.e., meaning "having the potential to"), rather than the mandatory sense (i.e., meaning "must"). Similarly, the words "include," "including," and "includes" mean "including, but not limited to".

DETAILED DESCRIPTION OF EMBODIMENTS

As disclosed, a security platform may have access to security data descriptive of the security posture of one or more assets within a client network. The scale of security data accessible by the security platform may be expansive and may include several layers of structure. To provide insights into a vast quantity of security data, the security platform may implement a specification for an interface that provides flexibility in building logically specified, nested queries of the security data. The security platform may improve performance of security data retrieval by using tailored queries that retrieve data from a database that satisfy a user request without retrieving extraneous data.

In some implementations, the security platform may determine a frontend query, transform the frontend query into a backend query, and use the backend query to retrieve data in accordance with the frontend query. For example, the security platform may specify an application programming interface (API) to support queries that are in format that is easily readable yet structured to indicate a variety of fields and nested structures. The security platform API may provide a framework for parsing requested fields, parsing arguments, and transforming a frontend query from an API request into a format from which appropriate data from a datastore may be retrieved.

In some implementations, a query format that is provided to a user may be a frontend query format, and one or more query formats usable to retrieve data from a database may be backend query formats. Continuing this example, the security platform may transform the frontend query format into one or more distinct backend queries. The one or more backend queries may be in one or more distinct formats from the frontend query. The security platform may aggregate backend query results from the one or more backend query formats and provide the backend query results in response to the frontend query.

In traditional approaches, an API, such as GraphQL, may provide flexibility in specifying attributes for data retrieval. However, while such a traditional API may allow a user to request different types of data, there are too many permutations of how data may be requested to provide pre-written backend queries for all possible permutations. In addition, unfortunately, backend support for specifying inline filtering logic as part of a frontend query request is not implemented in traditional frameworks by default and typically requires a manual approach—which is cumbersome and time consuming.

As disclosed, the security platform may transform a frontend query into a backend query. In some examples, the transformation may include parsing the frontend query to determine one or more of: one or more requested fields, one or more nested fields, filtering logic associated with a given field, pagination specifications, or sorting parameters.

In some implementations, a field may be an attribute of an object available within the security platform API. A field may be associated with one or more of: a data type, such as a number, a string of text, a date, or an object of data. For example, a field may indicate a number of vulnerabilities, a vulnerability score, an identifier, among other types of attributes that may be used to filter security data. In general, a field may be an attribute of an object that may be used for filtering data.

In some implementations, the security platform API may provide a specification for filtering based on a value of a given field or fields. For example, a field may specify a vulnerability score associated with a given asset within a client network deployment. An asset may include one or more compute instances, such as hardware processors, virtual machines, clusters, network devices, communications networks, storage, among other types of computing resources.

Continuing this example, a vulnerability score associated with a given asset may range from 0.1 to 10.0. The security platform API may support filter logic that includes logical operators for specifying a subset of all vulnerability scores. The logical operators may include one or more of: greater than, greater than or equal to, less than, less than or equal to, equality, inequality, a custom match, or a negation of a custom match, among other logical operators. In this example, a user may specify a filter applied to a vulnerability score field that filters out results that do not match the filter logic.

An advantage of the disclosed security platform is that the flexibility of specifying logical filters at multiple layers of a frontend query allows for precise retrieval of data. As a benefit of retrieving data with precision based on logical filtering, extraneous retrieval of data and filtering post-retrieval is avoided, thereby improving performance and bandwidth usage.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details.

Referring to FIG. 1, an example computing environment 100 illustrates various components of a security platform providing query transformations and layered filtering, in accordance with some embodiments.

In some implementations, the security platform 102 may provide an interface that allows for querying security data determined by one or more security services 104. The security platform 102 may also provide the one or more security services 104. Security data may be determined during the operation of the security services 104 with respect to one or more deployments of assets among one or more client networks.

In this example, the security platform may transform a frontend query that is specified in a first format into one or more queries that are specified in one or more backend query formats. The transformation may include parsing parameters for filtering query results. The security platform 102 may filter query results based on the parameters including one or more logical operations that operate on one or more aspects of security data. The security platform 102 may codify different relationships between security data and manage different attributes of the security data.

In some implementations, the security services 104 may include detection and profiling of cyberattacks. The security platform 102 may determine access attempt data with respect to particular assets. The security platform 102 may also determine cyberattack profiles that may be used to subsequently identify threat actors. A threat actor may include a tool, a software program, a compute instance, or some other entity associated with a cyberattack.

The security platform 102 may comprise a data ingestion service 106 that may store security data determined during operation of the one or more security services. The data ingestion service 106 may store security data within one or more data warehouses, such as data warehouse 108. In this example, the data warehouse 108 is included as part of the security platform 102, and the data warehouse 108 stores security data 110. However, in other examples, the data warehouse 108 may be provided by a cloud services provider, a data center, on-premises data storage systems, or a combination of one or more of: a cloud services provider, a data center, or on-premises data storage systems.

Figure 2:
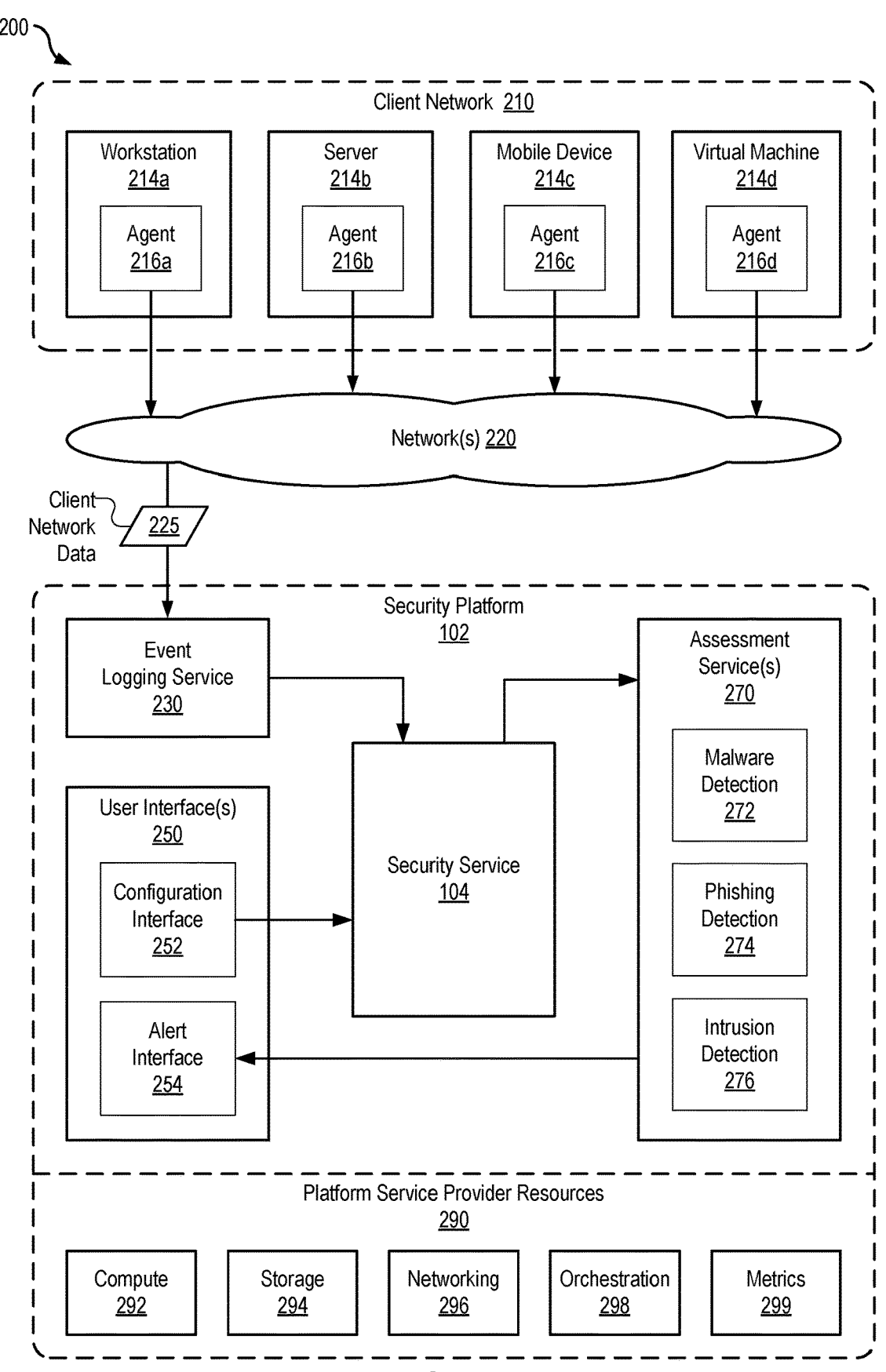
FIG. 2 is a block diagram illustrating example computing resources that implement a security platform, in accordance with some embodiments.

In some implementations, the security platform 102 may be implemented within a client network, as described in greater detail with respect to FIG. 2. In some implementations, portions of the security platform 102 may be implemented internally to a client network and other portions of the security platform 102 may be implemented externally from the client network.

In some implementations, the security platform 102 may comprise multiple network devices configured to monitor and track unauthorized access attempts or accesses, including different types of such network devices (e.g., SSH (secure shell), RDP (remote desktop), and so forth). The network devices may be configured to monitor and track unauthorized access attempts associated with one or more computing resources within a client network.

The security data 110 may comprise security characteristics associated with assets within a client deployment, such as an operating system, version information for one or more packages of installed software, version information for hardware, data descriptive of one or more hardware devices or processors, network information, among other types of security data.

In some implementations, security data 110 may include access attempt data that is indicative of characteristics associated with a set of access attempts. In some examples, access attempt data may be indicative of each member of a set of access attempts. In some examples, access attempt data may be indicative of additional characteristics, such as one or more of: an Internet Protocol (IP) address associated with a given one or more access attempts, a geographic region associated with an access attempt, a geopolitical entity associated with an access attempt, an internet service provider, a pattern of access attempts, an order of access attempts, a frequency of access attempts, a time of an access attempt, among other descriptive characteristics of a given set of access attempts.

In some implementations, the security data 110 may be organized into a schema that may be represented by a relational database. For example, a field within a query may be associated with a column within a table of a relational database. As described herein, a field may be an attribute of an object available within the security platform API. A field may be associated with one or more of: a data type, such as a number, a string of text, a date, or an object of data. For example, a field may indicate a number of vulnerabilities, a vulnerability score, an identifier, among other types of attributes that may be used to filter security data.

Given these elements of the security platform 102, a high-level example is described with respect to a frontend query received from a client. A more detailed example is provided with respect to FIG. 3.

In this example, a client 112 may query the security platform 102. The frontend query is represented by query data 114. The query data 114 may be transmitted to the security platform 102 via one or more communication networks, such as network(s) 116. Network(s) 116 may include the internet and one or more local area networks.

Continuing this example, the security platform 102 may receive the query data 114 at a service endpoint 118. A service endpoint 118 may be a processor or compute resource that may be referenced by an address, such as a web address. The service endpoint 118 may receive the query data 114.

The security platform 102, based on the query data 114, may transform the query data 114 into a backend query represented by transformed query data 120. For example, the security platform 102 may implement a query transformation module 122 that carries out the transformation of the query data 114 into transformed query data 120. The query transformation module 122 is described in greater detail with respect to FIG. 3.

The security platform 102 may use a data warehouse service 124 to query the data warehouse 108. The security platform 102 may query the data warehouse 108 using the transformed query. The data warehouse service 124 may provide communication services to one or more data warehouses. For example, the data warehouse service 124 may use an API provided by one or more data warehouses to send and receive queries, such as a backend query. In one example, the backend query may be a SQL (standard query language) query.

The transformed query may be represented by transformed query data 120. In response to querying the data warehouse 108 using the transformed query data 120, the security platform 102 may determine query results. Based on the query results, the security platform may provide the client 112 with a response to the frontend query.

FIG. 2 is a block diagram illustrating the security platform 102, according to some embodiments.

The security platform 102 may comprise one or more services implemented within a cloud computing environment and/or on a platform service provider network, such as a platform-as-a-service (PaaS) network, an infrastructure-as-a-service provider (IaaS) network, or a software-as-a-service (SaaS) network. The security platform 102 may be configured to communicate with agents 216a-d deployed on computing resources in a client network 210.

In this example, the client network described with respect to FIG. 1 may be implemented by the client network 210, and the referenced computing resources may be implemented by computing resources 214a-214d. In this example, the computing resources 214a-214d are depicted as a workstation, a server, a mobile device, and a virtual machine. In other examples, a computing resource 214 may comprise personal computers, cloud compute instances, laptops, among other types of computing resources, or some other resource that may be vulnerable to a cyberattack. Computing resources are described in greater detail below.

In this example, agents 216 may communicate with the security platform 102 over one or more intermediary networks 220. In some embodiments, the agents 216 may be configured to collect or compile network activity data or network event data, and transmit the data, depicted as client network data 225, to the security platform 102. The security platform 102 may receive network activity data from many different client networks operated by different entities, companies, organizations, groups, etc., and perform remote monitoring of the networks of these different clients.

As shown, the client network 210 in this example includes different types of computing resources, such as a workstation 214a, a server 214b, a mobile device 214c, and a virtual machine 214d. The virtual machine 214d may be an instance of a computer and operating system that is emulated and hosted on a physical virtual machine host. The virtual machine host may implement virtualization hardware and/or software (e.g., a hypervisor) to execute and manage multiple instances of guest operating systems. Example implementations of such virtualization technologies include VMware ESX/ESXI, Microsoft Hyper-V, Amazon Web Services, and Microsoft Azure. Another type of virtualized execution environment may be a hosted container, which provides a portable and isolated execution environment over a host operating system of a physical host. Examples of container hosting technologies include Docker, Google Kubernetes, Amazon Web Services, and Microsoft Azure. In some embodiments, the virtual machine 214d may be hosted in a platform service provider network, such as the platform service provider network that is hosting the security platform 102. In some embodiments, the agents 216 may be deployed on other types of computing systems, including embedded systems, networking devices, storage devices, Internet-of-Things (IoT) devices, vehicles, and the like.

In various embodiments, the network 220 may encompass any suitable combination of networking hardware and protocols necessary to enable communications between the agents 216 and the security platform 102. In some embodiments, the remote machines 214 may execute in a private network of a company, behind a company firewall, and the network 220 may include a public network such as the Internet, which lies outside the firewall. The network 220 may encompass the different telecommunications networks and service providers that collectively implement the Internet.

In some embodiments, the network 220 may also include private networks such as private local area networks (LANs), private wide area networks (WANs), or private wireless networks. The network 220 may be implemented using different hardware (e.g., modems, routers, switches, load balancers, proxy servers, etc.) and software (e.g., protocol stacks, routing software, firewall/security software, etc.) for establishing networking links between the remote machines 214 and the security platform 102. In some embodiments, the agents 216 may transmit the client network data 225 to the security platform 102 over secure communication channels such as transport layer security (TLS) connections implemented over the network 220.

As shown in this example, the security platform 102 is implemented using a number of supporting services 230, 108, 250, and 270 implemented by the platform service provider network. Clients of the security platform 102 may convey service requests to and receive responses from these services via their respective service interfaces. In some embodiments, the service request and responses may be defined as part of a RESTful API (e.g., one or more web services). The requests and responses may be formatted as JSON documents. In some embodiments, the security platform 102 may implement service interfaces using other types of remote procedure calling protocols, such as Google Protocol Buffers. The platform service provider network may provide the hardware and/or software needed to implement service endpoints for these services, and the request routing facilities to ensure that a request is properly routed to the appropriate endpoints.

As shown, the platform service provider network may provide different types of computing resources, such as platform service provider resources 290, which can be used by customers to implement hosted services. As shown, the platform service provider may provide resource services such as compute resource service 292, storage resource service 294, networking resources service 296, orchestration service 298, and resource metrics service 299. The services of the security platform 102 may be built using these underlying resource services provided by the platform service provider.

In some embodiments, the platform service provider resources 290 may implement features such as load balancing of service requests and/or dynamic management and scaling of service node pools. In some embodiments, each of the services 230, 108, 250, and 270 may be implemented using a pool of service nodes provided by the platform service provider, which may be individual instances of virtual machines. In some embodiments, the platform service provider may be a provider such as Amazon Web Services or Microsoft Azure.

In some embodiments, the security platform 102 may be configured to monitor, analyze, and respond to security-related incidents that are detected in the remote client networks 210. In some embodiments, the security platform 102 may implement an event logging service 230 that receives client network data 225 from a client network 210 and stores the received data. The event logging service 230 may implement service functionality to allow users or other software components to query the event logs.

As shown, in some embodiments, the assessment service (s) 270 may implement a variety of monitoring processes to generate alerts in response to detected security problems in the client network 210. These alerts may be forwarded to an alert interface 254, which may allow human security analysts to perform a more in-depth examination of any underlying security problems. For example, in some embodiments, a malware detection module 272 may examine collected machine event logs to detect installation of a particular type of malware executable. As another example, a phishing detection module 274 may examine the email event logs to detect phishing attacks using new or unusual email addresses, web addresses, or email content. As yet another example, an intrusion detection module 276 may examine the network event logs to detect suspicious communication patterns or attacker packet signatures. In some embodiments, the alerts generated by the assessment service(s) 270 may trigger automated mitigation actions to be performed on the client network 210 to address detected threats in the client network.

In some embodiments, the security platform 102 may implement one or more user interface(s) 250, which may be implemented as GUIs or web interfaces viewable using a web browser. In some embodiments, these user interfaces 250 may be implemented by client-side applications. As shown, the user interfaces may include the alert interface 254 to notify users of detected alerts. In some embodiments, the alert interface 254 may be accessible from both the client network 210 and a central monitoring location where security analysts are monitoring the client network.

In some embodiments, the user interface(s) 250 may also implement a configuration interface 252. The configuration interface 252 may be used to configure various aspects of the security platform 102, including the security service 104. For example, the configuration interface 252 may be used to control various aspects of how the security service 104 operates, including initiating a scan, indicating one or more computing resources, and/or specifying a scanning schedule.

In some implementations, the security platform 102 may be implemented within a container system of a cloud computing environment or a container system of a data center. For example, a container system may be implemented by one or more container orchestration systems, including Kubernetes™, Docker Swarm™, among others. The container orchestration system may run on a cluster of nodes. In some examples, a given node may comprise a container runtime, where the given node may be implemented by one or more compute instances provided by a cloud services provider. In some examples, a given node among the cluster of nodes may comprise a container runtime, compute resources, memory, and one or more container instances.

In some implementations, the security platform 102 may comprise multiple services. For example, the security platform 102 may comprise services implemented by containerized applications operating on one or more nodes of a cluster. In this example, the security platform 102 may be implemented by a one or more containerized applications.

FIG. 3 is a block diagram 300 illustrating various components of a security platform providing query transformations and layered filtering, according to some embodiments.

In this example, elements of a query are depicted. Additional features of queries, including queries comprising multiple layers, where one or more layers may be associated with logical filtering, are described with respect to FIGS. 4-7. A layer may be level of a nested query.

Continuing this example, the security platform 102 may use the frontend query 302 to determine a backend query. As depicted, the frontend query 302 may comprise a query name 304. The query 302 may specify one or more objects and one or more fields of the object.

In this example, for the sake of simplicity, the query 302 specifies a single object, as depicted by object name 306. A given object may comprise one or more layers of additional objects. The layers of an object may be representative of a data schema that describes relationships between security data collected and determined by the security platform 102. A given object may also comprise one or more fields, where a given field may be associated with an attribute of the given object.

Object name 306 may be representative of an object associated with "Assets". In general, an object may be associated with the object associated with "Assets" may comprise a plurality of fields, depicted by fields 308-1-308-N. In this example, field 308-1 may be associated with an "Identifier" field, and field 308-N may be associated with a "Location" field.

In this example, an asset may include one or more compute instances, such as hardware processors, virtual machines, clusters, network devices, communications networks, storage, among other types of computing resources. Afield may be an attribute of an object available within security platform API. A field may be associated with one or more of: a data type, such as a number, a string of text, a date, or an object of data. For example, a field may indicate a number of vulnerabilities, a vulnerability score, an identifier, among other types of attributes that may be used to filter security data.

An identifier of an asset may be string value, a numerical value, or some other identifier usable to distinguish a given asset from other assets within a client network deployment. An asset location may describe a geographic location, a data center identifier, a cloud services provider availability zone, among other types of descriptive data indicative of a physical location of an asset.

Figure 4:
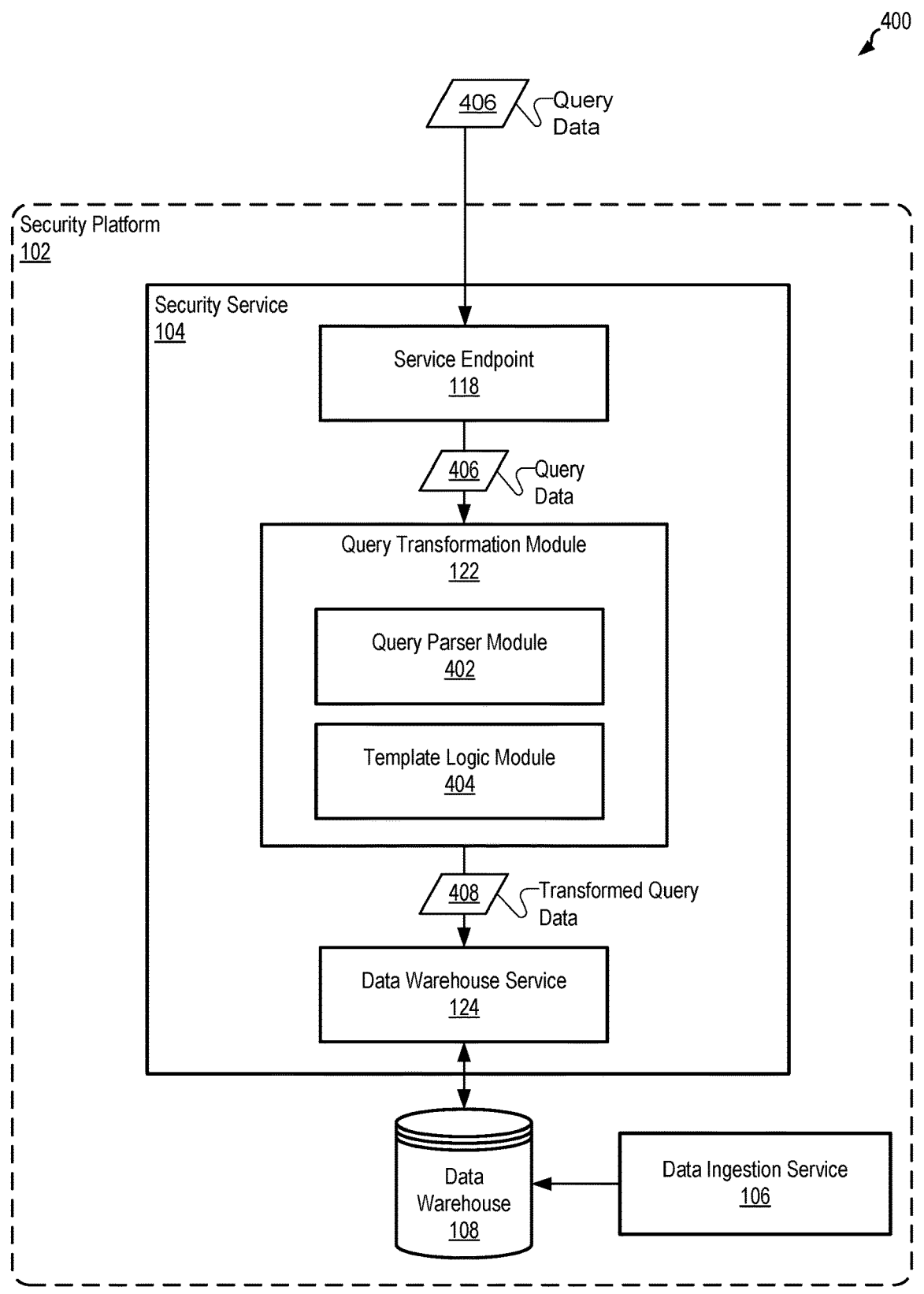
FIG. 4 is a block diagram illustrating a security platform providing query transformations and layered filtering, in accordance with some embodiments.

FIG. 4 is a block diagram 400 illustrating various components of a security platform providing query transformations and layered filtering, according to some embodiments.

In this example, an implementation of the query transformation module 122 is described. However, in other implementations, the query transformation module 122 may be implemented using a different combination of steps, combined steps, or omitting some of the steps described in this example.

As depicted, the query transformation module 122 comprises a query parser module 402 and a template logic module 404. The query transformation module 122 may, based on query data 406, determine transformed query data 408. Query data 406, similar to query data 114 described in FIG. 1, may be specified in a query format associated with a frontend query. Transformed query data 408, similar to transformed query data 120, may be specified in one or more backend query formats. The one or more backend query formats may be associated with respective data stores.

In some implementations, the security platform 102 may, based on the query parser module 402 and the template logic module 404, (1) codify fields of a frontend query and location within a datastore schema associated with the fields; (2) transform field data into a data object representative of the frontend query fields; (3) transform filtering logic into equivalent backend query logic; (4) transform paging and sorting parameters into associated one or more backend query formats; and/or (5) use template logic to generate a backend query, where the template logic uses one or more of: the transformed field data, the transformed filtering logic, and the transformed paging and sorting parameters. These five example steps are described in greater detail below.

In some implementations, with respect to step one, codifying fields of a frontend query and location within a datastore schema associated with the fields may be carried out using different techniques. As one example, information about fields of a frontend query may be projected and filtered and may be stored into a data object. In this example, the data object may be referred to as a catalog. In some implementations, the data object may be a Java object, but other types of objects may be used. Continuing this example, a data object may represent a primary frontend query type object.

A primary frontend query type object may be retrieved independently from other data objects. Each data object representative of a primary frontend query type object may be referred to as an entity object. Each entity object may comprise a list of field objects. A field object may represent a field available to be projected from a frontend query. As one example, an entity object may be associated with a security vulnerability.

In this example, the entity object may represent a particular security vulnerability, including attributes of the security vulnerability, such as one or more of: vulnerability name, vulnerability description, CVSS score, severity, risk score, among other descriptive aspects of the particular security vulnerability. A CVSS score may refer to a Common Vulnerability Score System score.

Continuing this example, a given field or attribute may be represented as an object in a map, which may codify information such as a particular column in a database schema to retrieve data associated with the field from. In some examples, where an entity object comprises one or more additional entity objects, one or more relationships indicative of the nesting of the entity object relative to the one or more additional entity objects may be codified into the catalog. In some implementations, the catalog may include one or more entity objects.

In some implementations, with respect to step two, transforming field data into a data object representative of the frontend query fields may be carried out using different techniques. As one example, the frontend query may be parsed to construct data objects representative of frontend query types. The frontend query types may be specified within a schema associated with the frontend query format.

Continuing this example, types, arguments, and/or requested fields may be parsed out of the frontend query. The security platform 102 may parse a list and/or structure of requested fields of a frontend query to determine requested fields of the frontend query. Parsing the frontend query may include determining nested fields. In some examples, data descriptive of the nested fields may be used to determine filtering scope, paging, and/or sorting parameters at associated nesting layers.

In some implementations, with respect to step three, transforming filtering logic into equivalent backend query logic may be carried out using different techniques. As one example, the security platform 102 may, based on parsing the frontend query, use a list of fields determined and use the filtering logic, to generate equivalent syntax to project the fields and filtering logic information from one or more data stores. For example, the data warehouse may be a data store that implements a SQL database.

In this example, a given field may be associated with a given column in a table of the database schema. In this example, a given logical specification among one or more logical specifications of the filtering logic may be transformed into a SQL query WHERE clause. In some implementations, filtering logic may include logical operators used with a given one or more fields.

Continuing this example, logical operations may include one or more of: greater than, greater than or equal to, less than, less than or equal to, equality, inequality, a custom match, or a negation of a custom match, among other logical operators. For example, a field may be associated with a value, and a logical operator may be used to specify results for which the field value satisfies one or more logical operators. For example, filtering logic may specify results for which a CVSS score is greater than X, where X may be value determined by the security platform 102 and represented within security data.

In some implementations, a parser generator tool may be used to parse components of a string representative of filtering logic into one or more fields used, one or more values, and/or one or more logical operators. In some examples, fields used within filtering logic may be added to a list of fields projected from the one or more data stores. Given the one or more fields, the security platform 102 may use a catalog object to determine a particular column and table within a database schema that is associated with a particular field.

In some implementations, with respect to step four, transforming paging and sorting parameters into associated one or more backend query formats may be carried out using different techniques. As one example, the security platform 102 may parse the frontend query to determine arguments representing paging data and sorting parameters. Paging data may indicate a size of a page to return as a result of the frontend query. The paging data may indicate a starting position for query results. Sorting parameters may indicate properties to use to order objects within a dataset. Sorting parameters may indicate whether to sort query results in ascending or descending order.

In some implementations, paging data may be used to determine a LIMIT clause and OFFSET clause alongside the ORDER BY clause in a backend query that is equivalent to one or more paging data indications. In some examples, a particular field in a sorting clause may be added to a list of fields to be projected from the one or more data stores. Given one or more fields, the security platform 102 may use a catalog object to determine a particular column and table within a database schema that is associated with a particular field.

In some implementations, with respect to step five, using template logic to generate a backend query may be carried out using different techniques. As one example, a template object may be used to programmatically match input data with template logic to determine the backend query. The input data may comprise the output determined from steps one through four, described above. For example, based on one or more fields, filtering logic, paging data, and/or sorting parameters, a template may be populated that determines the backend query.

A template object may comprise one or more portions of code that match respective one or more portions of the input data. For example, a particular field may match a part of the template object that generates a corresponding portion of a backend query, such as a SQL query. Similarly, with respect to the input data, if a field is not projected or specified, then the template object may not include a match, and no SQL query syntax may be generated.

In some implementations, an advantage may include the security platform 102 being able to use a same code path to generate different backend queries from frontend queries that share similar characteristics. In this way, the security platform 102 avoids providing specific pre-written backend queries for each individual frontend query in situations where the frontend queries are similarly structured and/or specified. Based on the large quantities of possible frontend queries that may be generated from a limited number of fields, such an advantage provides real-world performance benefits that allow for improved service, improved security measures, and improved remediation responses to security threats.

Figure 5:
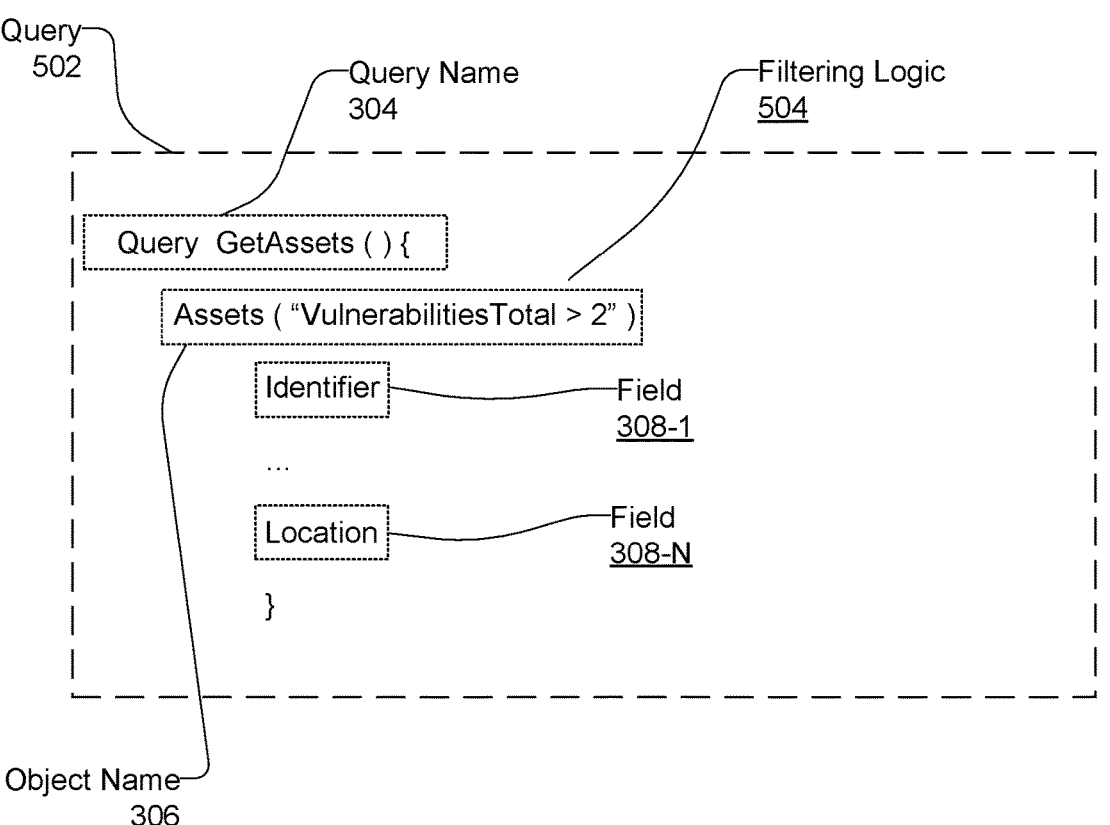
FIG. 5 is a block diagram illustrating a query format used by a security platform providing query transformations and layered filtering, in accordance with some embodiments.

FIG. 5 is a block diagram 500 illustrating various components of a security platform providing query transformations and layered filtering, according to some embodiments.

In this example, elements of a frontend query 502 are depicted, including filtering logic 504. Logical operators specified within filtering logic may be applied to fields used at different layers of a frontend query to narrow query results. As described above, a field may indicate a number of vulnerabilities, a vulnerability score, an identifier, location, among other types of attributes that may be used to filter security data.

Continuing this example, logical operations may include one or more of: greater than, greater than or equal to, less than, less than or equal to, equality, inequality, a custom match, or a negation of a custom match, among other logical operators. For example, a field may be associated with a value, and a logical operator may be used to specify results for which the field value satisfies one or more logical operators.

In this example, filtering logic may specify that only security data for which a total number of vulnerabilities, "VulnerabilitiesTotal" as depicted in FIG. 5, is greater than 2 may satisfy the backend query generated based on the frontend query 502. In general, one or more fields may be used with respect to one or more logical operators. In some examples, the filtering logic 504 may specify compound logical statements. For example, the filtering logic 504 may specify: ((STATEMENT-1) LOGICAL-OPERATOR-1 (STATEMENT-2) . . . ), where STATEMENT-1 may be filtering logic 504, STATEMENT-2 may be "VulnerabilitiesTotal<5", and LOGICAL-OPERATOR-1 may be "AND".

Figure 6:
FIG. 6 is a block diagram illustrating a query format used by a security platform providing query transformations and layered filtering, in accordance with some embodiments.

FIG. 6 is a block diagram 600 illustrating various components of a security platform providing query transformations and layered filtering, according to some embodiments.

In this example, elements of a frontend query 602 are depicted, including filtering logic 604 that is specified at multiple, respective layers 606. Logical operators specified within filtering logic may be applied to fields used at different layers of a frontend query to narrow query results.

In this example, filtering logic 604 may specify distinct logical statements at distinct layers 604 of the query 602. For example, at a first layer, layer 606-1, filtering logic 604-1 may specify filtering parameters, depicted as "FilterParameter-1", to be "VulnerabilitiesTotal". At a second layer, layer 606-2, filtering logic 604-2 may specify filtering parameters, depicted as "FilterParameters-2", to be "CVSS score>5.0".

Continuing this example, fields FieldName-1-FieldName-M may be associated with object ObjectName-1, where ObjectName-1 may be assets, as described with respect to FIG. 3. ObjectName-2 may be associated with a vulnerability, and FieldName-M may be associated with a CVSS score. In this example, filtering logic 604-1 may be "VulnerabilitiesTotal>2" and filtering logic 604-2 may be "CVSS score>3.0". In this way, among assets with a vulnerability total greater than two, only the assets with a CVSS score greater than 3.0 are returned.

In this example, the backend query may be generated to comprise equivalent SQL statements that query the security data for assets that have greater than 2 (two) vulnerabilities, where the vulnerability scores are greater than 3.0. In some implementations, a respective layer may be associated with respective filtering logic. In this example, filtering logic 604-1 is used by the security platform 102 to specify parameters for narrowing results associated with the first layer, layer 606-1, and filtering logic 604-2 is used by the security platform 102 to specify parameters for narrowing results associated with the second layer, layer 606-2.

FIG. 7 is a flowchart 700 that illustrates an example of the security platform providing query transformations and layered filtering. In FIG. 7, one or more hardware processors may be used to implement the example process, as described with respect to FIGS. 2 and 10.

FIG. 7 illustrates an example process that includes: determining, at 710, based on a frontend query specified in accordance with a first format, a first layer of one or more attributes associated with a set of structured data; determining, at 720, with respect to the frontend query, at least one additional layer of one or more attributes associated with the set of structured data; determining, at 730, based on the first layer and on the at least one additional layer, a backend query specified in accordance with a second format; determining, at 740, based on querying the database using the backend query, a dataset; and determining, at 750, based on the frontend query, a response indicative of the dataset.

Determining, at 710, based on the frontend query specified in accordance with the first format, the first layer of one or more attributes associated with the set of structured data may be carried out as described with respect to FIGS. 1-6. For example, the security platform 102 may receive query data 114, where query data 114 is specified in a first format. As described with respect to FIG. 6, the query data may comprise a first layer and a second layer.

Determining, at 720, with respect to the frontend query, at least one additional layer of one or more attributes associated with the set of structured data may be carried out as described with respect FIGS. 1-6. For example, the security platform 102 may determine fields, which may be attributes of an object, where the object is representative of security data. As described with respect to FIG. 1, security data may be organized according to a schema used to store the security data into one or more relational data stores.

Determining, at 730, based on the first layer and on the at least one additional layer, a backend query specified in accordance with the second format may be carried out as described with respect to FIGS. 1-6. For example, the security platform 102 may determine a second layer as described with respect to FIG. 6, where the second layer comprises additional fields, and in some cases, filtering logic.

Determining, at 740, based on querying the database using the backend query, the dataset may be carried out as described with respect to FIGS. 1-3. For example, the security platform 102 may generate the backend query and use a data warehouse service to query the database, where the dataset may comprise the query results. In this example, the data warehouse may comprise the database.

Determining, at 750, based on the frontend query, a response indicative of the dataset may be carried out as described with respect to FIGS. 1-6. For example, the security platform 102 may provide the dataset to a client 112 in response to the frontend query indicated by query data 114, where the dataset satisfies frontend query based on the backend query being generated as described with respect to FIG. 4.

FIG. 8 is a flowchart 800 that illustrates an example of the security platform providing query transformations and layered filtering. In FIG. 8, one or more hardware processors may be used to implement the example process, as described with respect to FIGS. 2 and 10.

FIG. 8 illustrates an example process that includes: parsing, at 810, in accordance with a first format, a first query comprising a plurality of layers of attribute specifications; determining, at 820, based on the parsing the first query and with respect to a first layer of the plurality of layers of attribute specifications, first filtering logic comprising a first one or more fields and a first one or more logical operators; determining, at 830, based on the parsing the first query and with respect to a second layer of the plurality of layers of attribute specifications, second filtering logic comprising a second one or more fields and a second one or more logical operators; and determining, at 840, based at least on the first filtering logic and on the second filtering logic, a second query that is in accordance with a second format.

Parsing, at 810, in accordance with the first format, the first query comprising a plurality of layers of attribute specifications may be carried out as described with respect to FIGS. 1-6. For example, as described with respect to FIG. 1, an attribute, or attribute specification, may be associated with a field, where fields are depicted and described with respect to FIGS. 3-6. As further described with respect to FIGS. 1-6, a frontend query may comprise multiple layers of fields. In this example, the first query may comprise a frontend query.

Determining, at 820, based on the parsing the first query and with respect to a first layer of the plurality of layers of attribute specifications, first filtering logic comprising a first one or more fields and a first one or more logical operators may be carried out as described with respect to FIGS. 1-6. For example, FIGS. 3-6 describe parsing a frontend query to determine layers of filtering logic. A first layer of filtering logic and a second layer of filtering logic are described in greater detail with respect to FIGS. 5 and 6.

Determining, at 830, based on the parsing the first query and with respect to a second layer of the plurality of layers of attribute specifications, second filtering logic comprising a second one or more fields and a second one or more logical operators may be carried out as described with respect to FIGS. 1-6. For example, FIGS. 3-6 describe parsing a frontend query to determine layers of filtering logic. A first layer of filtering logic and a second layer of filtering logic are described in greater detail with respect to FIGS. 5 and 6.

Determining, at 840, based on the first filtering logic and on the second filtering logic, the second query that is in accordance with the second format may be carried out as described with respect to FIGS. 1-6. For example, the second query may comprise a backend query, where determination of a backend query is described in greater detail with respect to FIGS. 3-6.

Figure 9:
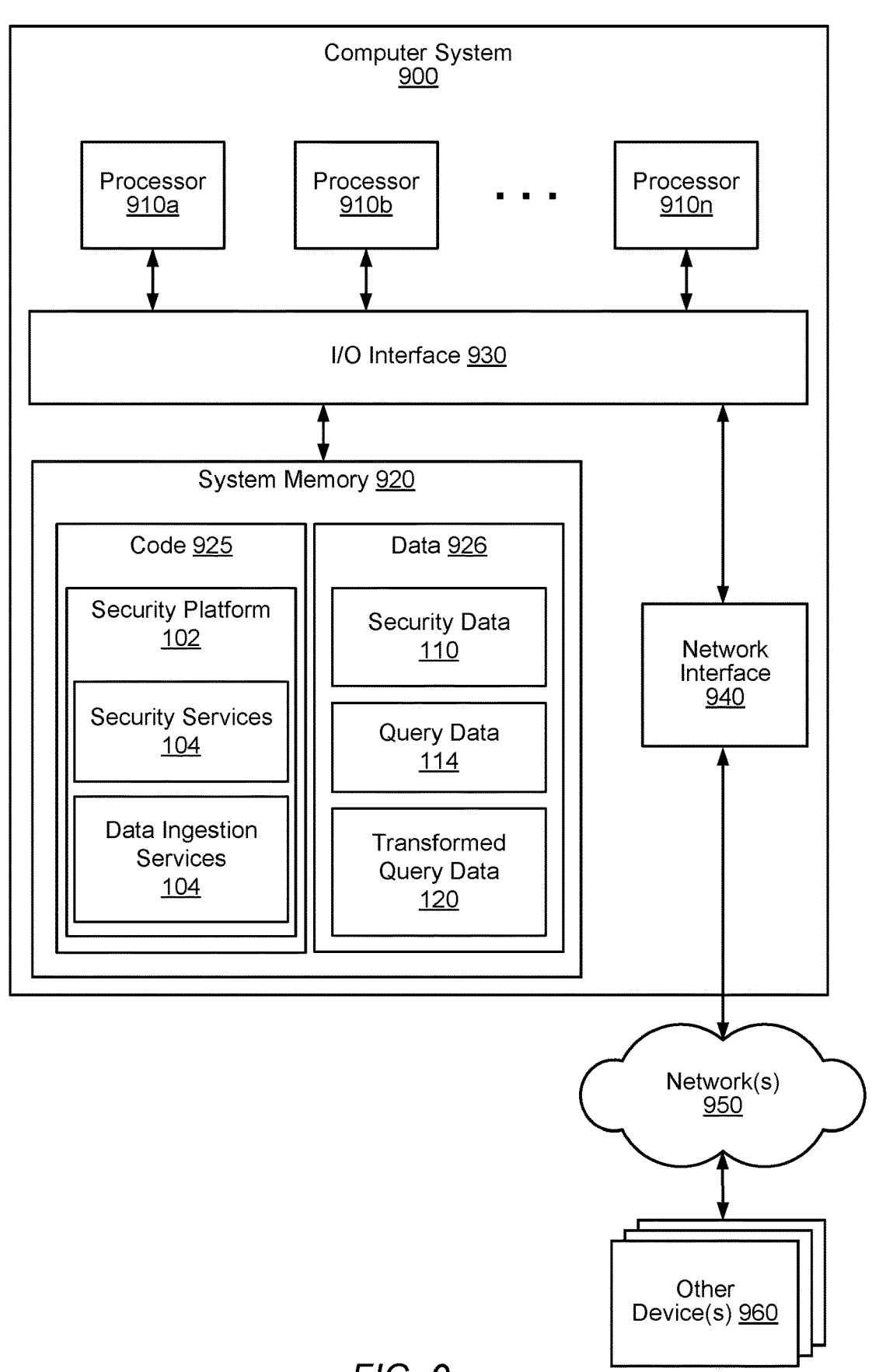
FIG. 9 is a block diagram illustrating an example computer system that may be used to implement one or more portions of a system providing query transformations and layered filtering, according to some embodiments.

FIG. 9 is a block diagram illustrating an example computer system 900 that is used to implement one or more portions of a system that implements a security platform 102, according to some embodiments. For example, the computer system 900 may be a server that implements one or more components of the security platform 102 of FIGS. 1-5.

Computer system 900 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 900 includes one or more processors 910, which may include multiple cores coupled to a system memory 920 via an input/output (I/O) interface 930. Computer system 900 further includes a network interface 940 coupled to I/O interface 930. In some embodiments, computer system 900 may be a uniprocessor system including one processor 910, or a multiprocessor system including several processors 910a-n, as shown. The processors 910 may be any suitable processors capable of executing instructions. For example, in various embodiments, processors 910 may implement one of a number of instruction set architectures (ISAs), such as the x86, PowerPC, SPARC, or MIPS ISA.

As shown, the computer system 900 may also include one or more network communication devices (e.g., network interface 940) for communicating with other systems and/or components over a communications network. For example, an instance of an application executing on computer system 900 may use network interface 940 to communicate with another server application executing on another computer system, as described herein.

As shown, computer system 900 may use its network interface 940 to communicate with one or more other devices 960, such as persistent storage devices and/or one or more I/O devices. In some embodiments, some of these other devices may be implemented locally on the computer system 900, accessible via the I/O interface 930. In various embodiments, persistent storage devices may include disk drives, tape drives, solid state memory, other mass storage devices, or any other persistent storage device. The computer system 900 may store instructions and/or data in persistent storage devices and retrieve the stored instruction and/or data as needed.

As shown, the computer system 900 may include one or more system memories 920 that store instructions and data accessible by processor(s) 910. In various embodiments, system memories 920 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 920 may be used to store code 925 or executable instructions to implement the methods and techniques described herein. For example, the executable instructions may include instructions to implement a network scanner (including associated sub-components: a network latency component; a dynamic RTT timeout value; RTT parameters; and a statistics components). The system memory 920 may also be used to store data 926 needed or produced by the executable instructions. For example, the in-memory data 926 may include access attempt 122 and hash data 120, as discussed with respect to FIG. 1.

In some embodiments, some of the code 925 or executable instructions may be persistently stored on the computer system 900 and may have been loaded from external storage media. The persistent storage of the computer system 900 and the external media are examples of non-transitory computer-readable storage media, which may be used to store program instructions to be executed by the computer system 900. A non-transitory computer-readable storage medium may provide the capability to store information in a form readable by a machine (e.g., computer system 900). Non-transitory computer-readable media may include storage media such as magnetic or optical media, disk or DVD/CD-ROM devices, archival tapes, network-attached storage systems, or other computer systems.

In some embodiments, the I/O interface 930 may be configured to coordinate I/O traffic between processor 910, system memory 920 and any peripheral devices in the system, including through network interface 940 or other peripheral interfaces. In some embodiments, I/O interface 930 may perform any necessary protocol, timing, or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

In some embodiments, the network interface 940 may allow data to be exchanged between computer system 900 and other devices attached to a network. The network interface 940 may also allow communication between computer system 900 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 900 or may be distributed on various nodes of a distributed system that includes computer system 900. In some embodiments, similar input/output devices may be separate from computer system 900 and may interact with one or more nodes of a distributed system that includes computer system 900 through a wired or wireless connection, such as over network interface 940. Network interface 940 may commonly support one or more wireless networking protocols (e.g., Wi-Fi/IEEE 802.11, or another wireless networking standard). In some embodiments, the network interface 940 may support communication via telecommunications/telephony networks such as analog voice networks or digital fiber communications networks, via storage area networks such as Fibre Channel SANs, or via any other suitable type of network and/or protocol.

In some implementations, advantages and features of the present disclosure may be further described by the following 20 statements.

1. A method comprising: determining, based on a frontend query specified in accordance with a first format, a first layer of one or more attributes associated with a set of structured data; determining, with respect to the frontend query, at least one additional layer of one or more attributes associated with the set of structured data; determining, based on the first layer and on the at least one additional layer, a backend query specified in accordance with a second format; and determining, based on querying a database using the backend query, a dataset; and determining, based on the frontend query, a response indicative of the dataset.

2. The method of any of the preceding statements, wherein the first format is associated with an application programming interface.

3. The method of any of the preceding statements, wherein the second format is associated with a database storing the set of structured data.

4. The method of any of the preceding statements, wherein the set of structured data comprises a plurality of attributes represented by a respective plurality of fields of data.

5. The method of any of the preceding statements, wherein a respective field of the plurality of fields is associated with a respective column of a table within the database.

6. The method of any of the preceding statements, further comprising: determining, based on parsing the frontend query with respect to the first layer, first filtering logic comprising a first one or more logical operators and a first one or more fields of the set of data; determining, based on the first filtering logic, a first one or more statements associated with a template; and generating, based on the first one or more statements and on the template, a first one or more query clauses; wherein the backend query comprises the first one or more query clauses.

7. The method of any of the preceding statements, further comprising: determining, based on parsing the frontend query with respect to the second layer, second filtering logic comprising a second one or more logical operators and a second one or more fields of the set of data; determining, based on the second filtering logic, a second one or more statements associated with the template; and generating, based on the second one or more statements and on the template, a second one or more query clauses; wherein the backend query further comprises the second one or more query clauses.

8. The method of any of the preceding statements, wherein the dataset determined by querying the database using the backend query comprises data that satisfies the frontend query without comprising data that does not satisfy the frontend query.

9. A system comprising: a memory storing executable instructions; and one or more processors that execute the executable instructions to: determine, based on a frontend query specified in accordance with a first format, a first layer of one or more attributes associated with a set of structured data; determine, with respect to the frontend query, at least one additional layer of one or more attributes associated with the set of structured data; determine based on the first layer and on the at least one additional layer, a backend query specified in accordance with a second format; and determine, based on querying a database using the backend query, a dataset; and determine, based on the frontend query, a response indicative of the dataset.

10. The system of any of the preceding statements, wherein the first format is associated with an application programming interface.

11. The system of any of the preceding statements, wherein the second format is associated with a database storing the set of structured data.

12. The system of any of the preceding statements, wherein the set of structured data comprises a plurality of attributes represented by a respective plurality of fields of data.

13. The system of any of the preceding statements, wherein the one or more processors further execute the executable instructions to: determine, based on parsing the frontend query with respect to the first layer, first filtering logic comprising a first one or more logical operators and a first one or more fields of the set of data; determine, based on the first filtering logic, a first one or more statements associated with a template; and generate, based on the first one or more statements and on the template, a first one or more query clauses; wherein the backend query comprises the first one or more query clauses.

14. The system of any of the preceding statements, wherein the one or more processors further execute the executable instructions to: determine, based on parsing the frontend query with respect to the second layer, second filtering logic comprising a second one or more logical operators and a second one or more fields of the set of data; determine, based on the second filtering logic, a second one or more statements associated with the template; and generate, based on the second one or more statements and on the template, a second one or more query clauses; wherein the backend query further comprises the second one or more query clauses.

15. The system of any of the preceding statements, wherein the dataset determined by querying the database using the backend query comprises data that satisfies the frontend query without comprising data that does not satisfy the frontend query.

16. One or more non-transitory computer-accessible storage media storing executable instructions that, when executed by one or more processors, cause a computer system to: determine, based on a frontend query specified in accordance with a first format, a first layer of one or more attributes associated with a set of structured data; determine, with respect to the frontend query, at least one additional layer of one or more attributes associated with the set of structured data; determine based on the first layer and on the at least one additional layer, a backend query specified in accordance with a second format; and determine, based on querying a database using the backend query, a dataset; and determine, based on the frontend query, a response indicative of the dataset.

17. The non-transitory computer-accessible storage media of any of the preceding statements, wherein the first format is associated with an application programming interface, and wherein the second format is associated with a database storing the set of structured data 18. The non-transitory computer-accessible storage media of any of the preceding statements, wherein the set of structured data comprises a plurality of attributes represented by a respective plurality of fields of data.

19. The non-transitory computer-accessible storage media of any of the preceding statements, wherein the one or more processors further execute the executable instructions to: determine, based on parsing the frontend query with respect to the first layer, first filtering logic comprising a first one or more logical operators and a first one or more fields of the set of data; determine, based on the first filtering logic, a first one or more statements associated with a template; and generate, based on the first one or more statements and on the template, a first one or more query clauses; wherein the backend query comprises the first one or more query clauses.

20. The non-transitory computer-accessible storage media of any of the preceding statements, wherein the one or more processors further execute the executable instructions to: determine, based on parsing the frontend query with respect to the second layer, second filtering logic comprising a second one or more logical operators and a second one or more fields of the set of data; determine, based on the second filtering logic, a second one or more statements associated with the template; and generate, based on the second one or more statements and on the template, a second one or more query clauses; wherein the backend query further comprises the second one or more query clauses.

In some implementations, additional advantages and features of the present disclosure may be further described by the following 20 statements.

1. A method comprising: parsing, in accordance with a first format, a first query comprising a plurality of layers of attribute specifications; determining, based on the parsing the first query and with respect to a first layer of the plurality of layers of attribute specifications, first filtering logic comprising a first one or more fields and a first one or more logical operators; determining, based on the parsing the first query and with respect to a second layer of the plurality of layers of attribute specifications, second filtering logic comprising a second one or more fields and a second one or more logical operators; and determining, based at least on the first filtering logic and on the second filtering logic, a second query that is in accordance with a second format.

2. The method of any of the preceding statements, further comprising: determining, based on the first filtering logic, a first one or more statements associated with a template; and generating, based on the first one or more statements and on the template, a first one or more query clauses; wherein the backend query comprises the first one or more query clauses.

3. The method of any of the preceding statements, further comprising: determining, based on the second filtering logic, a second one or more statements associated with the template; and generating, based on the second one or more statements and on the template, a second one or more query clauses; wherein the backend query further comprises the second one or more query clauses.

4. The method of any of the preceding statements, wherein the dataset determined by querying the database using the backend query comprises data that satisfies the frontend query without comprising data that does not satisfy the frontend query.

5. The method of any of the preceding statements, wherein the first format is associated with an application programming interface.

6. The method of any of the preceding statements, wherein the second format is associated with a database storing the set of structured data.

7. The method of any of the preceding statements, wherein a respective attribute of the plurality of layers of attributes is associated with a respective column of a table within the database.

8. A system comprising: a memory storing executable instructions; and one or more processors that execute the executable instructions to: parse, in accordance with a first format, a first query comprising a plurality of layers of attribute specifications; determine, based on the parsing the first query and with respect to a first layer of the plurality of layers of attribute specifications, first filtering logic comprising a first one or more fields and a first one or more logical operators; determine, based on the parsing the first query and with respect to a second layer of the plurality of layers of attribute specifications, second filtering logic comprising a second one or more fields and a second one or more logical operators; and determine, based at least on the first filtering logic and on the second filtering logic, a second query that is in accordance with a second format.

9. The system of any of the preceding statements, wherein the one or more processors further execute the executable instructions to: determine, based on the first filtering logic, a first one or more statements associated with a template; and generate, based on the first one or more statements and on the template, a first one or more query clauses; wherein the backend query comprises the first one or more query clauses.

10. The system of any of the preceding statements, wherein the one or more processors further execute the executable instructions to: determine, based on the second filtering logic, a second one or more statements associated with the template; and generate, based on the second one or more statements and on the template, a second one or more query clauses; wherein the backend query further comprises the second one or more query clauses.

11. The system of any of the preceding statements, wherein the dataset determined by querying the database using the backend query comprises data that satisfies the frontend query without comprising data that does not satisfy the frontend query.

12. The system of any of the preceding statements, wherein the first format is associated with an application programming interface.

13. The system of any of the preceding statements, wherein the second format is associated with a database storing the set of structured data.

14. The system of any of the preceding statements, wherein a respective attribute of the plurality of layers of attributes is associated with a respective column of a table within the database.

15. One or more non-transitory computer-accessible storage media storing executable instructions that, when executed by one or more processors, cause a computer system to: parse, in accordance with a first format, a first query comprising a plurality of layers of attribute specifications; determine, based on the parsing the first query and with respect to a first layer of the plurality of layers of attribute specifications, first filtering logic comprising a first one or more fields and a first one or more logical operators; determine, based on the parsing the first query and with respect to a second layer of the plurality of layers of attribute specifications, second filtering logic comprising a second one or more fields and a second one or more logical operators; and determine, based at least on the first filtering logic and on the second filtering logic, a second query that is in accordance with a second format.

16. The non-transitory computer-accessible storage media of any of the preceding statements, wherein the one or more processors further execute the executable instructions to: determine, based on the first filtering logic, a first one or more statements associated with a template; and generate, based on the first one or more statements and on the template, a first one or more query clauses; wherein the backend query comprises the first one or more query clauses.

17. The non-transitory computer-accessible storage media of any of the preceding statements, wherein the one or more processors further execute the executable instructions to: determine, based on the second filtering logic, a second one or more statements associated with the template; and generate, based on the second one or more statements and on the template, a second one or more query clauses; wherein the backend query further comprises the second one or more query clauses.

18. The non-transitory computer-accessible storage media of any of the preceding statements, wherein the dataset determined by querying the database using the backend query comprises data that satisfies the frontend query without comprising data that does not satisfy the frontend query.

19. The non-transitory computer-accessible storage media of any of the preceding statements, wherein the first format is associated with an application programming interface.

20. The non-transitory computer-accessible storage media of any of the preceding statements, wherein the second format is associated with a database storing the set of structured data.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A method comprising:
receiving a frontend query that requests security data associated with assets in a network;
parsing, in accordance with a first format, the frontend query to determine a plurality of layers of attribute specifications;
determining, based on the parsing of the frontend query and with respect to a first layer of the plurality of layers of attribute specifications, first filtering logic comprising a first one or more fields and a first one or more logical operators;
determining, based on the parsing of the frontend query and with respect to a second layer of the plurality of layers of attribute specifications, second filtering logic comprising a second one or more fields and a second one or more logical operators;
generating, based at least on the first filtering logic and on the second filtering logic, a backend query for a database in accordance with a second format, including:
identifying, based on the first filtering logic, one or more first statements in a template;
generating, based on the one or more first statements and the template, a first query clause of the backend query, wherein the first query clause transforms the first one or more fields of the into one or more locations in a schema of the database;
identifying, based on the second filtering logic, one or more second statements in the template; and
generating, based on the one or more second statements and the template, a second query clause of the backend query, wherein the second query clause transforms the second one or more logical operators of the frontend query into one or more logical operators in a syntax of the second format; and
executing the backend query on the database to determine a result dataset, wherein the result dataset includes security data about one or more assets in the network that satisfies the frontend query without comprising data that does not satisfy the frontend query.

2. The method of claim 1, wherein the generating of the backend query further comprises: transforming a sorting or paging parameter in the frontend query according to the second format.

3. The method of claim 1, wherein the identifying of the one or more first statements in the template comprises matching the first filtering logic to one or more portions of code used to generate the first query clause.

4. The method of claim 1, wherein:

the database is implemented as part of a security platform that monitors the network; and the security data includes network activity data or network event data of the network collected by agents deployed in the network.

5. The method of claim 1, wherein the first format is associated with an application programming interface.

6. The method of claim 1, wherein the second format is associated with a database storing the set of structured data.

7. The method of claim 6, wherein a respective attribute of the plurality of layers of attributes is associated with a respective column of a table within the database.

8. A system comprising:

a memory storing executable instructions; and one or more processors that execute the executable instructions to:

receive a frontend query that requests security data associated with assets in a network;

parse, in accordance with a first format, the frontend query comprising a plurality of layers of attribute specifications;

determine, based on the parsing of the frontend query and with respect to a first layer of the plurality of layers of attribute specifications, first filtering logic comprising a first one or more fields and a first one or more logical operators;

determine, based on the parsing of the frontend query and with respect to a second layer of the plurality of layers of attribute specifications, second filtering logic comprising a second one or more fields and a second one or more logical operators;

generate, based at least on the first filtering logic and on the second filtering logic, a backend query for a database in accordance with a second format, including to:

identify, based on the first filtering logic, one or more first statements in a template;

generate, based on the one or more first statements and the template, a first query clause of the backend query, wherein the first query clause transforms the first one or more fields of the into one or more locations in a schema of the database;

identify, based on the second filtering logic, one or more second statements in the template; and generate, based on the one or more second statements and the template, a second query clause of the backend query, wherein the second query clause transforms the second one or more logical operators of the frontend query into one or more logical operators in a syntax of the second format; and execute the backend query on the database to determine a result dataset, wherein the result dataset includes security data about one or more assets in the network that satisfies the frontend query without comprising data that does not satisfy the frontend query.

9. The system of claim 8, wherein to generate the backend query, the one or more processors that execute the executable instructions to transform a sorting or paging parameter in the frontend query according to the second format.

10. The system of claim 8, wherein to identify the one or more first statements in the template, the one or more processors that execute the executable instructions to match the first filtering logic to one or more portions of code used to generate the first query clause.

11. The system of claim 8, wherein:

the database is implemented as part of a security platform that monitors the network; and the security data includes network activity data or network event data of the network collected by agents deployed in the network.

12. The system of claim 8, wherein the first format is associated with an application programming interface.

13. The system of claim 8, wherein the second format is associated with a database storing the set of structured data.

14. The system of claim 8, wherein a respective attribute of the plurality of layers of attributes is associated with a respective column of a table within the database.

15. One or more non-transitory computer-accessible storage media storing executable instructions that, when executed by one or more processors, cause a computer system to:

receive a frontend query that requests security data associated with assets in a network;

parse, in accordance with a first format, the frontend query comprising a plurality of layers of attribute specifications;

determine, based on the parsing of the frontend query and with respect to a first layer of the plurality of layers of attribute specifications, first filtering logic comprising a first one or more fields and a first one or more logical operators;

determine, based on the parsing of the frontend query and with respect to a second layer of the plurality of layers of attribute specifications, second filtering logic comprising a second one or more fields and a second one or more logical operators;

generate, based at least on the first filtering logic and on the second filtering logic, a backend query for a database in accordance with a second format, including to:

identify, based on the first filtering logic, one or more first statements in a template;

generate, based on the one or more first statements and the template, a first query clause of the backend query, wherein the first query clause transforms the first one or more fields of the into one or more locations in a schema of the database;

identify, based on the second filtering logic, one or more second statements in the template; and generate, based on the one or more second statements and the template, a second query clause of the backend query, wherein the second query clause transforms the second one or more logical operators of the frontend query into one or more logical operators in a syntax of the second format; and execute the backend query on the database to determine a result dataset, wherein the result dataset includes security data about one or more assets in the network that satisfies the frontend query without comprising data that does not satisfy the frontend query.

16. The non-transitory computer-accessible storage media of claim 15, wherein to generate the backend query, the executable instructions when executed by the one or more processors further cause a computer system to transform a sorting or paging parameter in the frontend query according to the second format.

17. The non-transitory computer-accessible storage media of claim 15, wherein to identify the one or more first statements in the template, the executable instructions when executed by the one or more processors cause a computer system to match the first filtering logic to one or more portions of code used to generate the first query clause.

18. The non-transitory computer-accessible storage media of claim 15, wherein:

the database is implemented as part of a security platform that monitors the network; and the security data includes network activity data or network event data of the network collected by agents deployed in the network.

19. The non-transitory computer-accessible storage media of claim 15, wherein the first format is associated with an application programming interface.

20. The non-transitory computer-accessible storage media of claim 19, wherein the second format is associated with a database storing the set of structured data.

* * * * *